(12) United States Patent
Dunwoody et al.

(10) Patent No.: US 10,961,145 B2
(45) Date of Patent: Mar. 30, 2021

(54) OPTICAL FIBER WITH LOW FICTIVE TEMPERATURE

(71) Applicant: Corning Incorporated, Corning, NY (US)

(72) Inventors: Steven Akin Dunwoody, Castle Hayne, NC (US); Robert Clark Moore, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 145 days.

(21) Appl. No.: 15/710,074

(22) Filed: Sep. 20, 2017

(65) Prior Publication Data

US 2018/0093915 A1  Apr. 5, 2018

Related U.S. Application Data

(60) Provisional application No. 62/428,739, filed on Dec. 1, 2016, provisional application No. 62/404,345, filed on Oct. 5, 2016.

(51) Int. Cl.
  *C03B 37/025* (2006.01)
  *C03B 37/027* (2006.01)
  *C03B 37/029* (2006.01)

(52) U.S. Cl.
  CPC ........ *C03B 37/0253* (2013.01); *C03B 37/029* (2013.01); *C03B 37/02727* (2013.01); *C03B 2205/42* (2013.01); *C03B 2205/44* (2013.01)

(58) Field of Classification Search
  CPC .............. C03B 37/0253; C03B 37/029; C03B 2205/55; C03B 2205/56
  See application file for complete search history.

(56) References Cited

U.S. PATENT DOCUMENTS 9,309,143 B2    4/2016   Dunwoody et al.
2005/0281521 A1  12/2005  Oku et al.
(Continued)

FOREIGN PATENT DOCUMENTS

JP   63004207 A    1/1988
WO   2017044543 A1  3/2017

OTHER PUBLICATIONS

International Search Report and Written Opinion PCT/US2017/054872 dated Jan. 16, 2018.
(Continued)

*Primary Examiner* — Cynthia Szewczyk
(74) *Attorney, Agent, or Firm* — Kevin L. Bray

(57) ABSTRACT

Optical fibers having low fictive temperature and methods of making such fibers are described. Management of the cooling rate of an optical fiber during fiber draw permits control over the fictive temperature of the fiber. Non-monotonic cooling rates are shown to promote reductions in fiber fictive temperature. The non-monotonic cooling includes slower cooling rates in upstream portions of the process pathway and faster cooling rates in downstream portions of the process pathway. Reduction in fiber fictive temperature is achieved by controlling the ambient temperature of the fiber to slow the cooling rate of the fiber in upstream portions of the process pathway that correspond to the fiber temperature regime in which the fiber viscosity is sufficiently low to permit efficient structural relaxation. Increases in cooling rate in downstream portions of the process pathway permit adjustment of fiber temperature as needed to meet entrance temperature requirements of downstream processing units. Lower fiber fictive temperature and lower fiber attenuation are achieved at faster draw speeds through non-monotonic cooling of fiber temperature.

15 Claims, 5 Drawing Sheets

(56) References Cited

U.S. PATENT DOCUMENTS

| | | |
|---|---|---|
| 2011/0289979 A1* | 12/2011 | Faler ................ C03B 37/02718 65/424 |
| 2012/0053043 A1* | 3/2012 | Hammerle ............. C03C 25/12 501/35 |
| 2015/0040614 A1 | 2/2015 | Dunwoody et al. |
| 2016/0168008 A1 | 6/2016 | Bookbinder et al. |
| 2017/0073265 A1* | 3/2017 | Bookbinder ...... C03B 37/02727 |
| 2017/0297947 A1 | 10/2017 | Billings et al. |

OTHER PUBLICATIONS

European Patent Application No. 17784514.6 Office Action dated Oct. 9, 2020; 8 Pages; European Patent Office.

\* cited by examiner

OPTICAL FIBER WITH LOW FICTIVE TEMPERATURE

This application claims the benefit of priority under 35 U.S.C. § 119 of U.S. Provisional Application Ser. No. 62/428,739 filed on Dec. 1, 2016 and U.S. Provisional Application Ser. No. 62/404,345 filed on Oct. 5, 2016, the content of which is relied upon and incorporated herein by reference in its entirety.

FIELD

This description pertains to optical fibers. More particularly, this description pertains to optical fibers having low fictive temperature. Fibers with low fictive temperature exhibit low attenuation of optical signals. This description also pertains to methods of controlled cooling to form optical fibers having low fictive temperature.

BACKGROUND

In the manufacturing of the optical fibers, the optical preforms are heated to temperatures well above the glass softening point and then drawn at large draw down ratios to form optical fibers 125 µm in diameter. Due to the high draw temperatures, large draw down ratios and fast draw speeds, the glass is far from an equilibrium state, resulting in optical fibers with high fictive temperature. High fictive temperature is undesirable because high fictive temperature is known to correlate with increased attenuation of optical signals in optical fibers. To reduce attenuation in optical fibers, it is desirable to modify processing conditions to produce optical fibers with lower fictive temperature.

Efforts to reduce fictive temperature have emphasized slow cooling to stabilize the optical fiber in a state closer to an equilibrium state. Prolonged cooling an optical fiber at temperatures in the glass transition range of the fiber is one strategy for reducing fictive temperature. The extent to which fictive temperature can be reduced in existing fiber processing systems at the draw speeds used in optical fiber manufacturing, however, is limited because the residence time of the optical fiber at temperatures within the glass transition range are too short (typically <0.2 sec) to permit significant relaxation of the structure of the glass. Because of the short residence time, the structure of the glass remains far from the equilibrium state and the attenuation of the optical fiber remains too high for many applications. It would be desirable to develop methods of processing that enable the production of optical fibers having low fictive temperature so that optical fibers with reduced attenuation can be achieved.

SUMMARY

Optical fibers having low fictive temperature and methods of making such fibers are described. Management of the cooling rate of an optical fiber during fiber draw permits control over the fictive temperature of the fiber. Non-monotonic cooling rates are shown to promote reductions in fiber fictive temperature. The non-monotonic cooling includes slower cooling rates in upstream portions of the process pathway and faster cooling rates in downstream portions of the process pathway. Reduction in fiber fictive temperature is achieved by controlling the ambient temperature in the vicinity of the fiber to slow the cooling rate of the fiber in upstream portions of the process pathway that correspond to the fiber temperature regime in which the fiber viscosity is sufficiently low to permit efficient structural relaxation. Increases in cooling rate in downstream portions of the process pathway permit adjustment of fiber temperature as needed to meet entrance temperature requirements of downstream processing units. Lower fiber fictive temperature and lower fiber attenuation are achieved at faster draw speeds through non-monotonic cooling of optical fibers.

The present disclosure extends to:
A method of processing an optical fiber comprising:
  cooling an optical fiber from a first fiber temperature to a second fiber temperature at a first cooling rate, said first cooling rate being less than 5000° C./s;
  cooling said optical fiber from a third fiber temperature to a fourth fiber temperature at a second cooling rate, said third fiber temperature being less than or equal to said second fiber temperature, said second cooling rate being greater than said first cooling rate and less than 5000° C./s.

The present disclosure extends to:
A method of processing an optical fiber comprising:
  cooling an optical fiber from a first fiber temperature to a second fiber temperature in a slow cooling device along a process pathway; said slow cooling device having an entrance, an exit, and a controlled cooling region; said optical fiber entering said slow cooling device at said first fiber temperature at said entrance, said optical fiber exiting said slow cooling device at said second fiber temperature at said exit; said controlled cooling region including two or more zones for processing said optical fiber; each of said zones having an average ambient temperature, a maximum ambient temperature and a minimum ambient temperature; said average ambient temperature differing in each of said zones; a difference between said maximum ambient temperature and said minimum ambient temperature in each of said zones being less than 25° C.; each of said zones cooling said optical fiber at an average cooling rate less than 5000° C./s.

The present disclosure extends to:
A method of processing an optical fiber comprising:
  drawing an optical fiber from a preform at a draw speed greater than 42 m/s, said optical fiber having a fictive temperature less than 1540° C.

The present disclose extends to:
An apparatus for processing an optical fiber comprising:
  a slow cooling device, said slow cooling device having an entrance for receiving an optical fiber, an exit for delivering an optical fiber, and a controlled cooling region between said entrance and said exit, said controlled cooling including two or more zones for processing an optical fiber, said two or more zones including a first zone maintained at a first ambient temperature and a second zone maintained at a second ambient temperature, said first zone being upstream of said second zone, said second ambient temperature being at least 500° C., said first ambient temperature being greater than said second ambient temperature by at least 100° C.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
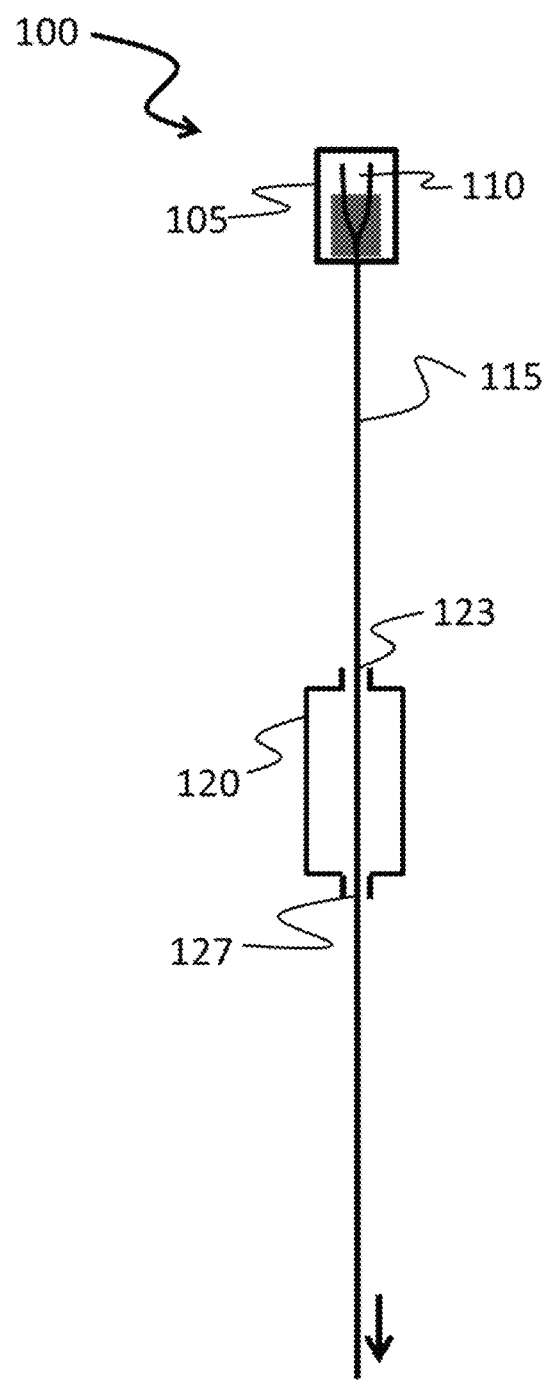
FIG. 1 depicts a fiber processing system and method having a draw furnace and a slow cooling device.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims which follow, reference will be made to a number of terms which shall be defined to have the following meanings:

Fiber temperature refers to the average temperature of the core and cladding regions of a glass optical fiber.

Fictive temperature refers to the average fictive temperature of the core and cladding regions of a glass optical fiber.

Ambient refers to an environment to which an optical fiber is exposed during processing.

Ambient temperature refers to a temperature of the environment to which an optical fiber is exposed during processing.

Reference will now be made in detail to illustrative embodiments of the present description.

The present description provides optical fibers having low attenuation and low fictive temperature and methods for making such optical fibers that are implemented at high draw speed. The optical fibers exhibit attenuation of optical signals less than 0.200 dB/km at a wavelength of 1550 nm. The optical fibers are prepared by a process that includes controlled cooling of the optical fiber. The controlled cooling permits production of optical fibers with fictive temperature less than 1550° C. The attenuation and fictive temperature of the optical fibers are achieved in fiber draw processes operated at draw speeds greater than 40 m/s.

In various embodiments, the attenuation of the optical fiber at a wavelength of 1550 nm is less than 0.200 dB/km, or less than 0.195 dB/km, or less than 0.190 dB/km, or less than 0.185 dB/km, or in the range from 0.170 db/km-0.200 dB/km, or in the range from 0.175 db/km-0.195 dB/km, or in the range from 0.180 db/km-0.190 dB/km.

In various embodiments, the attenuation of the optical fiber at a wavelength of 1310 nm is less than 0.340 dB/km, or less than 0.335 dB/km, or less than 0.330 dB/km, or less than 0.325 dB/km, or in the range from 0.310 db/km-0.340 dB/km, or in the range from 0.315 db/km-0.335 dB/km, or in the range from 0.320 db/km-0.330 dB/km.

In various embodiments, the fictive temperature of the optical fiber is less than 1550° C., or less than 1545° C., or less than 1540° C., or less than 1535° C., or less than 1530° C., or less than 1525° C., or in the range from 1500° C.-1550° C., or in the range from 1510° C.-1540° C., or in the range from 1515° C.-1535° C.

Embodiments further extend to optical fibers exhibiting two or more of the performance attributes (attenuation of at 1550 nm, attenuation at 1310 nm, and fictive temperature) disclosed herein.

Optical fibers in accordance with the embodiments disclosed herein are produced in fiber draw processes operated at draw speeds greater than 30 m/s, or greater than 40 m/s, or greater than 42 m/s, or greater than 45 m/s, or greater than 47 m/s, or greater than 50 m/s, or greater than 55 m/s, or greater than 60 m/s, or in the range from 30 m/s-70 m/s, or in the range from 40 m/s-65 m/s, or in the range from 42 m/s-63 m/s, or in the range from 44 m/s-60 m/s, or in the range from 46 m/s-58 m/s.

In a fiber draw process, optical fibers are formed by drawing a fiber from a glass preform. The glass preform is heated to a softened state and an optical fiber is drawn from the softened preform through the action of gravity and applied tension. As the fiber is drawn from the preform, it cools and as it cools, the structure of the glass evolves from a relatively disordered state in the preform to a more ordered state in the cooled fiber. The driving force for ordering of glass structure during cooling is a lowering of energy and approach to a thermodynamic equilibrium state. The thermodynamic equilibrium state corresponds to the minimum energy state of the glass. As a glass cools, however, its viscosity increases and the structural rearrangements needed for structural relaxation are inhibited. As a result, the time scale needed to reach the equilibrium state is increased.

The extent to which the structure of the glass relaxes over a given time period during cooling depends on the rate of cooling. At fast cooling rates, the viscosity of the glass increases rapidly and the window of time in which the viscosity is sufficiently low to permit structural rearrangements is short. As a result, the extent of relaxation of glass structure is limited, the approach to equilibrium is kinetically inhibited, and the glass remains in a non-equilibrium state. As the cooling rate decreases, the time window in which is the glass exhibits a viscosity in the range conducive to structural relaxation is increased and a closer approach of the glass to the equilibrium structural state is achieved during cooling.

As is known in the art, fictive temperature is an indicator of structure in glasses. As the structure of a glass relaxes and approaches an equilibrium state, the fictive temperature of the glass decreases. For a given composition, glasses with a high fictive temperature are further removed from equilibrium and have less relaxed structures than glasses with a low fictive temperature. Relaxation of glass structure is accompanied by a reduction in fictive temperature.

Processing conditions that lower the fictive temperature of optical fibers are desirable because optical fibers with low fictive temperatures exhibit low attenuation. The fictive temperature of an optical fiber is influenced by controlling the cooling rate of the fiber during manufacture. Processing stages used to control the cooling rate of an optical fiber are referred to herein as slow cooling devices. A slow cooling device includes a controlled cooling region that establishes an ambient temperature to which the optical fiber is exposed during cooling. During the draw process, an optical fiber passes through the controlled cooling region and the temperature of the fiber is influenced by the thermal conditions (including ambient temperature) maintained in the controlled cooling region.

In one embodiment, a heated gas is supplied to the controlled cooling region and the optical fiber is exposed to the heated gas as it passes through the controlled cooling region during processing. The gas environment surrounding the optical fiber is referred to herein as the ambient or ambient environment. The temperature of the heated gas corresponds to the ambient temperature, where the ambient temperature is less than the temperature of the fiber, but greater than room temperature. As a result, the rate of cooling of the fiber in the presence of the heated gas is slower than the rate of cooling of the fiber in the presence of room temperature air.

In principle, it is possible to achieve any degree of structural relaxation and any fictive temperature desired for an optical fiber by cooling the fiber at a sufficiently slow rate. The rate of cooling in a slow cooling device, for example, can be influenced by controlling the difference between the fiber temperature and the ambient temperature of the controlled cooling region. The closer the ambient temperature is to the fiber temperature, the slower is the cooling rate.

The time of exposure of the fiber to the controlled cooling region, referred to herein as "residence time", is also important to controlling the fictive temperature of the fiber. Relaxation of the structure of a glass occurs on a time scale characteristic of the atomic rearrangements that occur as the glass approaches an equilibrium state. For a given glass composition, the time scale for structural relaxation varies with the viscosity of the glass. When the glass has low viscosity, atomic rearrangements are more facile and the characteristic time scale of glass relaxation is shorter. In order for the structure of the glass to relax effectively, the viscosity of the glass must be sufficiently low for a sufficiently long period of time to enable structural rearrangement. Since glass viscosity varies with glass temperature, reductions in fictive temperature require processes in which the residence time of the fiber in a controlled cooling region maintained at a particular ambient temperature is sufficiently long to permit structural relaxation. To achieve the greatest reduction in fictive temperature at the particular ambient temperature of the controlled cooling region, the residence time of the fiber in the controlled cooling region should be sufficiently long to relax the structure of the glass to the extent possible at the particular ambient temperature of the controlled cooling region. Further reductions in fictive temperature can be realized by lowering the fiber temperature by systematically lowering the ambient temperature of the controlled cooling region (or passing the fiber through a series of controlled cooling regions with progressively decreasing ambient temperatures) and insuring that the residence time of the fiber in the controlled cooling region(s) is sufficiently long at each ambient temperature to permit structural relaxation to the greatest extent possible.

As the fiber temperature decreases, however, the time scale needed to effect structural relaxation to a degree capable of meaningfully reducing fictive temperature increases. At some point during cooling, a fiber temperature is reached at which the necessary time scale becomes unreasonably long for manufacturing. At this point, cooling rate is no longer a practical consideration and it is desirable to decrease the fiber temperature to room temperature at high cooling rates to improve process speed.

Preferred fiber temperatures that are conducive to structural relaxation in silica and doped silica are fiber temperatures in the range from 1000° C.-1700° C., or fiber temperatures in the range from 1100° C.-1650° C., or fiber temperatures in the range from 1200° C.-1600° C., or fiber temperatures in the range from 1250° C.-1550° C. or fiber temperatures in the range from 1300° C.-1500° C.

Continuous manufacturing processes, in which a fiber is drawn continuously at a particular draw speed, are preferred for reasons of cost and efficiency. Continuous manufacturing processes, however, present additional challenges for lowering fictive temperature because the optical fiber is in constant motion. Due to the constant motion, the fiber has a residence time in the controlled cooling region dictated by the draw speed. Increased residence time can be achieved by drawing fibers at lower speeds, but low draw speeds are not desirable from the perspective of process efficiency. At a particular draw speed, the length of the controlled cooling region also influences residence time. Due to space constraints in practical manufacturing facilities, however, the length of the controlled cooling region is necessarily limited.

Space constraints introduce further complications because systems used to process optical fibers include process units in addition to slow cooling devices. In a typical fiber manufacture process, the fiber is drawn from a preform situated in a draw furnace and routed through a process pathway that includes thermal treatment devices (e.g. slow cooling devices), coating devices (e.g. devices that apply liquid compositions for forming primary coatings, secondary coatings, and ink layers), metrology units (e.g. fiber diameter control), and various fiber handling devices (e.g. turning devices, take up spools). In order to reduce the space needed to manufacture optical fibers, it is desirable to position the process units as close as possible to each other. Close positioning of process units is complicated by the fact that operation of the different process units requires the fiber temperature to be within a particular range. In order to coat a fiber, for example, the fiber temperature needs to be sufficiently low to prevent vaporization of volatile components of liquid coating formulations applied to the surface of the fiber. Fiber handling devices require fiber temperatures that are sufficiently low to preserve the mechanical integrity of the fiber. If the fiber temperature is too high, bending or winding of a fiber can introduce permanent structural deformations that damage or comprise the integrity of the fiber. As a result, considerations related to fiber cooling extend beyond the temperature window associated with control of fictive temperature to include the lower temperatures needed for coating and handling of the fiber.

The competing demands on the evolution of fiber temperature during the fiber draw process necessitate compromises in the cooling rate of the fiber. On the one hand, slow cooling rates are preferred to further the objective of lowering the fictive temperature of the fiber. On the other hand, fast cooling rates are desired to further the objectives of compactness of the arrangement of processing units in manufacturing and high speed processing.

In conventional fiber draw processes, the competing demands on fiber temperature are resolved by incorporating a slow cooling device with a controlled cooling region held at a constant ambient temperature in the manufacturing process and adjusting the constant ambient temperature to a level that provides cooling at a sufficient rate to insure that the fiber temperature at the exit of a slow cooling device is sufficiently low to meet the requirements of a downstream processing unit.

While the compromise in cooling rates embodied in conventional fiber draw processes leads to a reduction in fiber fictive temperature and provides optical fibers with satisfactory attenuation for many applications, the present disclosure recognizes that further reductions in fiber fictive temperature and attenuation are possible in space-constrained high speed fiber drawing processes. In particular, the present disclosure demonstrates that lower fiber fictive temperature and lower fiber attenuation can be obtained in processes that utilize a slow cooling device operated at conditions of non-constant ambient temperature within the controlled cooling region. In particular, the present disclosure demonstrates that when the controlled cooling region of a slow cooling device is modified to include a non-uniform ambient temperature distribution, reductions in fiber fictive temperature and attenuation are realized relative to a corresponding process operated with a slow cooling device having a controlled cooling region held at a constant ambient temperature.

FIG. 1 illustrates a simplified system for drawing optical fibers that includes a draw furnace and a slow cooling device. As defined herein, a slow cooling device provides cooling of an optical fiber at a rate that is slower than the cooling rate of the optical fiber in stationary air at room temperature.

In one or more embodiments, the ambient temperature of the controlled cooling region or zones within the controlled cooling region can be established, varied, or maintained by controlling the temperature, pressure, and/or flow rate of a gas supplied to the ambient environment surrounding the fiber.

In one embodiment, the temperature and cooling rate of an optical fiber is controlled by supplying a gas to the controlled cooling region. The controlled cooling region is filled with a static or flowing gas and the ambient temperature and fiber cooling rate is varied by controlling the temperature, pressure and/or flow rate of the gas. Representative gases for use in the controlled cooling region of a slow cooling device include He, Ar, $N_2$, air, $CO_2$, Kr, and Xe. To facilitate a decrease in the fictive temperature of an optical fiber, slower cooling rates are preferred.

Higher gas pressures and/or faster gas flow rates lead to faster cooling rates, while lower gas pressures and/or slower gas flow rates lead to slower cooling rates. In one embodiment, the gas pressure in the ambient of controlled cooling is less than room pressure. In embodiments, the gas pressure in the controlled cooling region is less than 1.0 atm, or less than 0.9 atm, or less than 0.8 atm, or less than 0.7 atm, or less than 0.6 atm, or less than 0.5 atm, or less than 0.4 atm, or less than 0.3 atm, or in the range from 0.1 atm-1.0 atm, or in the range from 0.2 atm-0.9 atm, or in the range from 0.3 atm-0.8 atm, or in the range from 0.4 atm-0.7 atm.

The thermal conductivity of the gas in the ambient surrounding the fiber also influences the cooling rate. Gases with higher thermal conductivity lead to faster cooling rates, while gases with lower thermal conductivity lead to slower cooling rates. To promote slower cooling rates, the thermal conductivity of the gas at the ambient temperature of the ambient surrounding the fiber is less than $2.0 \times 10^{-4}$ cal/cm-s-K, or less than $1.8 \times 10^{-4}$ cal/cm-s-K, or less than $1.6 \times 10^{-4}$ cal/cm-s-K, or less than $1.5 \times 10^{-4}$ cal/cm-s-K, or less than $1.4 \times 10^{-4}$ cal/cm-s-K, or in the range $0.5 \times 10^{-4}$ cal/cm-s-K-$2.0 \times 10^{-4}$ cal/cm-s-K, or in the range $0.75 \times 10^{-4}$ cal/cm-s-K-$1.75 \times 10^{-4}$ cal/cm-s-K, or in the range $1.0 \times 10^{-4}$ cal/cm-s-K-$1.6 \times 10^{-4}$ cal/cm-s-K. In other embodiments, the thermal conductivity of the gas in the ambient surrounding the fiber is less than $2.0 \times 10^{-4}$ cal/cm-s-K, or less than $1.8 \times 10^{-4}$ cal/cm-s-K, or less than $1.6 \times 10^{-4}$ cal/cm-s-K, or less than $1.5 \times 10^{-4}$ cal/cm-s-K, or less than $1.4 \times 10^{-4}$ cal/cm-s-K, or in the range $0.5 \times 10^{-4}$ cal/cm-s-K-$2.0 \times 10^{-4}$ cal/cm-s-K, or in the range $0.75 \times 10^{-4}$ cal/cm-s-K-$1.75 \times 10^{-4}$ cal/cm-s-K, or in the range $1.0 \times 10^{-4}$ cal/cm-s-K-$1.6 \times 10^{-4}$ cal/cm-s-K at one or more temperatures in the range from 800° C.-1500° C. In still other embodiments, the thermal conductivity of the gas in the ambient surrounding the fiber is less than $2.0 \times 10^{-4}$ cal/cm-s-K, or less than $1.8 \times 10^{-4}$ cal/cm-s-K, or less than $1.6 \times 10^{-4}$ cal/cm-s-K, or less than $1.5 \times 10^{-4}$ cal/cm-s-K, or less than $1.4 \times 10^{-4}$ cal/cm-s-K, or in the range $0.5 \times 10^{-4}$ cal/cm-s-K-$2.0 \times 10^{-4}$ cal/cm-s-K, or in the range $0.75 \times 10^{-4}$ cal/cm-s-K-$1.75 \times 10^{-4}$ cal/cm-s-K, or in the range $1.0 \times 10^{-4}$ cal/cm-s-K-$1.6 \times 10^{-4}$ cal/cm-s-K at each temperature in the range from 800° C.-1500° C.

The temperature of the gas in the ambient surrounding the optical fiber also influences the cooling rate. In particular, the difference between the fiber temperature and the ambient temperature established by the gas represents a driving force for transfer of heat from the fiber to the gas and influences the rate of cooling. Larger differences between fiber temperature and ambient temperature lead to faster heat transfer and faster cooling rates, while smaller differences between fiber temperature and ambient temperature lead to slower heat transfer and slower cooling rates. As noted herein, to reduce fiber fictive temperature it is preferable to process the fiber at a slow rate of cooling.

To promote slower cooling rates, in one or more embodiments herein, the difference between the fiber temperature and ambient temperature is less than 500° C., or less than 400° C., or less than 300° C., or less than 200° C., or in the range from 50° C.-500° C., or in the range from 100° C.-450° C., or in the range from 150° C.-400° C., or in the range from 200° C.-300° C., where the fiber temperature is greater than the ambient temperature. To promote faster cooling rates, in one or more embodiments herein, the difference between the fiber temperature and ambient temperature is greater than 200° C., or greater than 300° C., or greater than 400° C., or greater than 500° C., or in the range from 200° C.-800° C., or in the range from 300° C.-700° C., or in the range from 400° C.-600° C., where the fiber temperature is greater than the ambient temperature. In the foregoing embodiments, the fiber temperature corresponds to the fiber temperature at any point during cooling or any position within the controlled cooling region or zone of a controlled cooling region. The difference in fiber temperature and ambient temperature disclosed herein apply, for example, to the fiber temperature at the entrance, interior position, or exit of a slow cooling device, or to the fiber temperature at the entrance, interior position, or exit of a controlled cooling region, or to the fiber temperature at the entrance, interior position, or exit of a zone of a controlled cooling region, or to the fiber temperature at the entrance, interior position, or exit of a combination of two or more zones of a controlled cooling region.

System 100 includes draw furnace 105 with fiber preform 110. In one embodiment, fiber preform 110 is a silica or doped silica preform that includes a single compositional region or multiple compositional regions. The multiple compositional regions may be concentric. For example, fiber preform 110 may include a central region corresponding to the core composition of a fiber and one or more outer concentric regions corresponding to the compositions of one or more cladding layers of a fiber. The core and/or cladding regions may include pure silica or doped silica.

Optical fiber 115 is drawn from fiber preform 110 and directed to entrance 123 of slow cooling device 120. Optical fiber 115 passes through slow cooling device 120 and emerges at exit 127. The temperature of optical fiber 115 at exit 127 is less than the temperature of optical fiber 115 at entrance 123. Slow cooling device 120 includes an internal controlled cooling region that establishes an ambient temperature to which the fiber is exposed. Slow cooling device 120 effects controlled cooling of fiber 315 and enables cooling rates that are slower than the natural cooling rate of optical fiber 115 in stationary unheated air. In one embodiment, optical fiber 115 exits draw furnace 105 at a fiber temperature of ~1700° C. Optical fiber 115 exits draw furnace 105 and proceeds to slow cooling device 120. Optical fiber 115 continues to cool as it proceeds along the process pathway after emerging from slow cooling device 120 at exit 127.

System 100 defines a process pathway along which the fiber is directed. The process pathway is the route traversed by the fiber in a fiber draw process. The process pathway of system 100 extends from draw furnace 105 to beyond exit 127 of slow cooling device 120. The arrow defines the direction of conveyance of optical fiber 115 along the process pathway. As optical fiber 115 is processed, it exits draw furnace 105 and proceeds along the process pathway. Positions along the process pathway that are closer to the point of exit of the fiber from draw furnace 105 are said herein to be upstream of positions along the process pathway that are further away from the point of exit of the fiber from draw furnace 105, where distance from draw furnace 105 is understood herein to mean distance as measured along optical fiber 115. The direction of conveyance of the optical fiber is the downstream direction; the optical fiber is conveyed from upstream positions to downstream positions along the process pathway. For example, the portion of optical fiber 115 positioned between draw furnace 105 and entrance 123 of slow cooling device 120 is upstream of the portion of optical fiber 115 positioned further from draw furnace 105 than exit 127 of slow cooling device 120. Similarly, entrance 123 of slow cooling device 120 is upstream of exit 127 of slow cooling device 120 and draw furnace 105 is upstream of slow cooling device 120. Since optical fiber 115 passes through both draw furnace 105 and slow cooling device 120 along the process pathway, draw furnace 105 and slow cooling device 120 may be referred to herein as being operatively coupled along the process pathway.

Although not explicitly shown in FIG. 1, the fiber process pathway may further include other processing units positioned upstream or downstream from slow cooling device 120 (e.g. reheating stages, additional slow cooling devices, metrology units, fiber-turning devices, coating units, testing units, spooling units etc.) along the process pathway.

The draw speed (speed of conveyance) of an optical fiber along through slow cooling devices disclosed herein is greater than 30 m/s, or greater than 40 m/s, or greater than 42 m/s, or greater than 45 m/s, or greater than 47 m/s, or greater than 50 m/s, or greater than 55 m/s, or greater than 60 m/s, or in the range from 30 m/s-70 m/s, or in the range from 40 m/s-65 m/s, or in the range from 42 m/s-63 m/s, or in the range from 44 m/s-60 m/s, or in the range from 46 m/s-58 m/s.

Slow cooling device 120 includes a controlled cooling region designed to decrease the cooling rate of optical fiber 115 relative to the cooling rate in unheated air. The controlled cooling region is internal to slow cooling device 120 and encompasses the entirety of the internal volume of slow cooling device 120 or a portion thereof. Optical fiber 115 passes through the controlled cooling region as it proceeds along the process pathway from entrance 123 of slow cooling device 120 to exit 127 of slow cooling device 120. In various embodiments, the ambient temperature of the controlled cooling region is established with heating elements and/or heated gas flow in the environment near optical fiber 115.

In the conventional design, the controlled cooling region is maintained at a constant ambient temperature. The constant ambient temperature is a temperature between room temperature and the temperature of optical fiber 115 at entrance 123. The constant ambient temperature is preferably a temperature that permits (i) structural relaxation of optical fiber 115, (ii) a lowering of the fictive temperature of optical fiber 115, and/or (iii) closer approach of optical fiber 115 to an equilibrium state during cooling as described hereinabove.

A slow cooling device in accordance with the present description includes a controlled cooling region with a non-constant ambient temperature. Instead of a constant or uniform distribution of ambient temperature in the controlled cooling region, the controlled cooling region includes a gradient in ambient temperature. In one embodiment, the ambient temperature profile is non-monotonic and includes one or more step changes. A graded ambient temperature profile is motivated by recognition that the time scale for structural relaxation is shorter for higher fiber temperatures and progressively increases as the fiber temperature decreases. The graded ambient temperature profile is accordingly designed to provide higher ambient temperatures in the portion of the controlled cooling region closer to the entrance of the slow cooling device and lower ambient temperatures in the portion of the controlled cooling device closer to the exit of the slow cooling device.

The fiber temperature at the entrance of the slow cooling device is higher than the fiber temperature at the exit of the slow cooling device. The fiber temperature at the entrance of the slow cooling device is greater than 1400° C., or greater than 1500° C., or greater than 1600° C., or greater than 1700° C., or in the range from 1400° C.-1900° C., or in the range from 1450° C.-1800° C., or in the range from 1500° C.-1700° C. The fiber temperature at the exit of the slow cooling device is less than 1350° C., or less than 1300° C., or less than 1250° C., or less than 1200° C., or in the range from 1000° C.-1350° C., or in the range from 1050° C.-1300° C., or in the range from 1100° C.-1250° C., or in the range from 1000° C.-1250° C.

The higher fiber temperature at the entrance of the slow cooling device corresponds to a lower viscosity and more facile structural rearrangements upon cooling for the optical fiber at the entrance of the slow cooling device relative to the exit of the slow cooling device. Accordingly, structural relaxation is enhanced by maintaining a slower cooling rate in portions of the controlled cooling region closer to the entrance of the slow cooling device and to increase the cooling rate as needed in portions of the controlled cooling region closer to the exit of the slow cooling device to achieve a desired exit fiber temperature. The increase in cooling rate as the fiber approaches the exit of the slow cooling device can be designed to provide a fiber having a targeted fiber temperature at the exit of the slow cooling device. As noted above, the fiber temperature at the exit of the slow cooling device can be adjusted for compatibility with entrance conditions for downstream processing units in the fiber draw process.

Within the slow cooling device or controlled cooling region, portions in closer proximity to the entrance are said to be upstream of portions in closer proximity of the exit. As described more fully below, in some embodiments, the slow cooling device or controlled cooling region includes one or more zones for processing an optical fiber. The zones are discrete, separate processing regions located within the slow cooling device or controlled cooling region along the process pathway. An optical fiber enters the slow cooling device or controlled cooling region at an entrance and is conveyed downstream through the one or more zones to the exit of the slow cooling device or controlled cooling region. When two or more zones are present, the zones differ in position relative to the entrance and exit of the slow cooling device or controlled cooling region. The position of a zone relative to another zone is specified as upstream or downstream along the process pathway. A particular zone is upstream of a different zone if the particular zone is positioned in closer proximity to the entrance of the slow cooling device or controlled cooling region along the process pathway than the different zone. Similarly, a particular zone is downstream of a different zone if the particular zone is positioned in closer proximity to the exit of the slow cooling device or controlled cooling region along the process pathway than the different zone.

In the graded ambient temperature profile of the present slow cooling device, the ambient temperature distribution is skewed to provide higher ambient temperatures near the entrance of the slow cooling device and in upstream portions of the controlled cooling region to promote longer residence times for the fiber at higher fiber temperatures. By skewing the ambient temperature profile in this way, the lower viscosity state of the fiber is maintained for a longer time, greater structural relaxation occurs, and lower fiber fictive temperatures are achieved. To achieve sufficient cooling to insure compatibility of the fiber exiting the slow cooling device with downstream processing units, the ambient temperature distribution is skewed to ambient temperatures in the downstream portion of the controlled cooling region sufficient to compensate for the slower cooling rates associated with the higher ambient temperatures maintained in the upstream portion of the controlled cooling region.

Several observations of the present slow cooling device relative to conventional slow cooling devices are noteworthy. In the conventional slow cooling device, the controlled cooling region is maintained at a constant ambient temperature. The constant ambient temperature is selected to insure that the fiber temperature at the exit of the slow cooling device is compatible for further processing by downstream units. Factors that influence selection of the constant ambient temperature include the fiber temperature at the entrance of the slow cooling device, the length of the slow cooling device, draw speed, and manner of control of the ambient temperature (e.g. thermal conductivity, flow rate, and/or pressure of the gas supplied to the controlled cooling region).

The constant ambient temperature selected for the conventional slow cooling device reflects a compromise of several competing considerations. The present description recognizes that in order to properly balance the competing considerations, the constant ambient temperature selected for the controlled cooling region of a conventional slow cooling device is necessarily less than optimal for promoting the more efficient structural relaxation that occurs at the higher fiber temperatures present in the portion of the controlled cooling region near the entrance of the slow cooling device. Relative to the fiber temperature at the entrance of the slow cooling device, the constant ambient temperature is sufficiently low to cool the fiber at a rate that shortens the residence time of the fiber at the higher fiber temperatures that are more conducive to structural relaxation.

In the present slow cooling device, the ambient temperature profile of the controlled cooling region includes higher ambient temperatures in upstream portions of the controlled cooling region and lower ambient temperatures in downstream portions of the controlled cooling region. The higher ambient temperatures in upstream portions slow the cooling rate of the fiber and extend the time at which the fiber is at a fiber temperature sufficient to maintain a viscosity suitable for efficient structural relaxation. To achieve a desired fiber temperature at the exit of the slow cooling device, the ambient temperature of downstream portions of the controlled cooling region of the present slow cooling device is lowered sufficiently to increase the cooling rate to the degree necessary to provide a targeted exit fiber temperature.

For slow cooling devices of a given design and length having the same entrance fiber temperature and same exit fiber temperature in a process of a given draw speed, the ambient temperatures in the upstream portions of the controlled cooling region of the present slow cooling device are higher than the constant ambient temperature that would be utilized for a corresponding conventional slow cooling device. The higher upstream ambient temperatures slow the cooling rate of the fiber in the portions of the slow cooling device at which the fiber temperature is higher, so greater structural relaxation occurs in the upstream portions of the controlled cooling region of the present slow cooling device relative to a corresponding conventional slow cooling device.

It is recognized, however, that in order to achieve a particular fiber exit temperature, the ambient temperatures in the downstream portions of the controlled cooling region of the present slow cooling device need to be lower than the constant ambient temperature required to achieve the same fiber exit temperature for a corresponding conventional slow cooling device. Although the lower ambient temperatures lead to faster cooling rates of the fiber in the downstream portions of the controlled cooling region of the present slow cooling device and less efficient structural relaxation relative to a corresponding conventional slow cooling device, the less efficient structural relaxation occurs in a fiber temperature regime in which the time scale for structural relaxation of the fiber is too long to allow for a meaningful reduction in fictive temperature. As a result, even though less structural relaxation occurs in the downstream portions of the controlled cooling region of the present slow cooling device relative to a corresponding conventional prior art slow cooling device, the difference in structural relaxation is immaterial and more than compensated by the larger difference in structural relaxation that occurs in the upstream portions of the controlled cooling region of the present slow cooling device relative to the corresponding conventional slow cooling device, where the fiber temperature is such that the fiber viscosity is low and structural relaxation is efficient. Lower fiber fictive temperature accordingly results from fibers processed by the present slow cooling device relative to a corresponding conventional slow cooling device.

The ambient temperature profile of the controlled cooling region of the present slow cooling device is designed to promote structural relaxation for longer times when the fiber temperature is high relative to a corresponding conventional slow cooling device. The longer times are achieved by cooling the fiber at slower rates in the upstream portions of the controlled cooling region of the present slow cooling device relative to a corresponding conventional slow cooling device. The tradeoff is a faster cooling rate and less structural relaxation in the downstream portions of the controlled cooling region of the present slow cooling device relative to a corresponding conventional slow cooling device. On balance, however, a greater net reduction in fiber fictive temperature occurs in the present slow cooling device relative to a corresponding conventional slow cooling device due to a skewing of ambient temperatures in the controlled cooling region away from constant ambient temperature to a distribution that provides slower cooling rates when the fiber has a higher fiber temperature and lower viscosity, and faster cooling rates when the fiber has a lower fiber temperature and higher viscosity. The ambient temperature distribution of the present slow cooling device provides fibers with lower fictive temperature while still enabling adjustment of fiber exit temperature as needed to insure compatibility with downstream processing units.

In one embodiment, the ambient temperature gradient of the controlled cooling region of the present slow cooling device is continuous with continuous variations in ambient temperature in the direction of fiber conveyance through the controlled cooling region. The continuous variation in ambient temperature has a constant or variable slope across the controlled cooling region in the direction of fiber conveyance.

In another embodiment, the ambient temperature gradient of the controlled cooling region of the present slow cooling device includes step changes or discontinuities in ambient temperature. In one embodiment, the controlled cooling region includes two or more zones, where the ambient temperature within a zone is constant or approximately constant and the constant ambient temperatures in different zones differ. The number of zones is at least two, or at least three, or at least four, or at least five, or at least six, or in the range from 2-10, or in the range from 3-9, or in the range from 4-8.

In another embodiment, the controlled cooling region includes two or more zones, where the ambient temperature varies within each zone and the average ambient temperatures in different zones differ. The variation in ambient temperature in each zone extends from a maximum ambient temperature to a minimum ambient temperature within the spatial dimensions of the zone, where the average ambient temperature is selected as the average of the maximum ambient temperature and the minimum ambient temperature. The difference between the maximum ambient temperature and minimum ambient temperature within a zone is less than 30° C., or less than 25° C., or less than 20° C., or in the range from 0° C.-30° C., or in the range from 5° C.-30° C., or in the range from 5° C.-25° C., or in the range from 5° C.-20° C., or in the range from 10° C.-30° C., or in the range from 10° C.-25° C. The number of zones is at least two, or at least three, or at least four, or at least five, or at least six, or in the range from 2-10, or in the range from 3-9, or in the range from 4-8. Further embodiments include controlled cooling regions with two or more zones that include one or more zones having a constant ambient temperature and one or more zones that include a variation in ambient temperature.

In one or more embodiments, the two or more zones include an upstream zone and a downstream zone, where the constant ambient temperature in the upstream zone is greater than the constant ambient temperature in the downstream zone by at least 100° C., or at least 150° C., or at least 200° C., or at least 250° C., or at least 300° C., or at least 350° C., or at least 400° C., or by an amount in the range from 100° C.-500° C., or by an amount in the range from 150° C.-450° C., or by an amount in the range from 200° C.-400° C., or by an amount in the range from 125° C.-300° C., or by an amount in the range from 150° C.-250° C. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In one or more embodiments, the two or more zones include an upstream zone and a downstream zone, where the average ambient temperature in the upstream zone is greater than the average ambient temperature in the downstream zone by at least 100° C., or at least 150° C., or at least 200° C., or at least 250° C., or at least 300° C., or at least 350° C., or at least 400° C., or by an amount in the range from 100° C.-500° C., or by an amount in the range from 150° C.-450° C., or by an amount in the range from 200° C.-400° C., or by an amount in the range from 125° C.-300° C., or by an amount in the range from 150° C.-250° C. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In one or more embodiments, the ambient temperature to which the optical fiber is exposed during the draw process is a temperature of at least 500° C., or at least 600° C., or at least 700° C., or at least 800° C., or at least 900° C., at least 1000° C., or at least 1100° C., or a temperature in the range from 500° C.-1200° C., or a temperature in the range from 600° C.-1100° C., or a temperature in the range from 700° C.-1000° C. In one embodiment, the ambient temperature is a constant temperature maintained throughout a zone of the controlled cooling region or slow cooling device.

The cooling rate of the fiber temperature in the controlled cooling region of the present slow cooling device is constant or variable, continuous or discontinuous, and/or monotonic or non-monotonic. The cooling rate is preferably variable with a slower cooling rate in portions of the controlled cooling region proximate to the entry point of the fiber into the slow cooing device and a faster cooling rate in portions of the controlled cooling region proximate to the exit point of the fiber from the slow cooling device. In one embodiment, the cooling rate in upstream portions of the controlled cooling region is slower than the cooling rate in downstream portions of the controlled cooling region.

In one or more embodiments, the controlled cooling region includes two or more zones and the cooling rate within each zone is constant and the constant cooling rate differs in different zones. The cooling rate within a zone is monotonic or non-monotonic and the transition of cooling rate from one zone to another zone is continuous or discontinuous.

In one or more embodiments, the controlled cooling region includes two or more zones in which the constant cooling rates of fiber temperature differ in each of the two or more zones, where the constant cooling rate of fiber temperature in each of the two or more zones is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s.

In one or more embodiments, the controlled cooling region includes an upstream zone and a downstream zone in which the constant cooling rates of fiber temperature differ, where the constant cooling rate of fiber temperature in each of the upstream zone and downstream zone is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In one or more embodiments, the controlled cooling region includes an upstream zone and a downstream zone in which the constant cooling rates of fiber temperature differ, where the constant cooling rates of fiber temperature in each of the upstream zone and downstream zone is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s, and where the constant cooling rate in the downstream zone is greater than the constant cooling rate in the upstream zone by at least 250° C./s, or at least 500° C./s, or at least 750° C./s, or at least 1000° C./s, or by an amount in the range from 250° C./s-2000° C./s, or 500° C./s-1750° C./s, or 750° C./s-1500° C./s. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In one or more embodiments, the controlled cooling region includes an upstream zone and a downstream zone in which the constant cooling rates of fiber temperature differ, where the constant cooling rates of fiber temperature in each of the upstream zone and downstream zone is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s, and where the constant cooling rate in the downstream zone is greater than the constant cooling rate in the upstream zone by at least 5%, or at least 10%, or at least 15%, or at least 20%, or by an amount in the range from 5%-25%, or in the range from 10%-20%. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In one or more embodiments, the controlled cooling region includes two or more zones and the cooling rate within each zone is variable and the average cooling rate differs in different zones. The variation in cooling rate in each zone extends from a maximum cooling rate to a minimum cooling rate within the spatial dimensions of the zone, where the average cooling rate is selected as the average of the maximum cooling rate and the minimum cooling rate. The difference between the maximum cooling rate and minimum cooling rate within a zone is less than 100° C./s, or less than 75° C./s, or less than 50° C./s, or less than 25° C./s, or in the range from 0° C./s-100° C./s, or in the range from 10° C./s-90° C./s, in the range from 10° C./s-50° C./s, or in the range from 20° C./s-80° C./s, or in the range from 20° C./s-60° C./s, The cooling rate within a zone is monotonic or non-monotonic and the transition of cooling rate from one zone to another zone is continuous or discontinuous.

In one or more embodiments, the controlled cooling region includes two or more zones in which the average cooling rates of fiber temperature differ in each of the two or more zones, where the average cooling rate of fiber temperature in each of the two or more zones is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s.

In one or more embodiments, the controlled cooling region includes an upstream zone and a downstream zone in which the average cooling rates of fiber temperature differ, where the average cooling rate of fiber temperature in each of the upstream zone and downstream zone is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In one or more embodiments, the controlled cooling region includes an upstream zone and a downstream zone in which the average cooling rates of fiber temperature differ, where the average cooling rates of fiber temperature in each of the upstream zone and downstream zone is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s, and where the average cooling rate in the downstream zone is greater than the average cooling rate in the upstream zone by at least 250° C./s, or at least 500° C./s, or at least 750° C./s, or at least 1000° C./s, or by an amount in the range from 250° C./s-2000° C./s, or 500° C./s-1750° C./s, or 750° C./s-1500° C./s. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In one or more embodiments, the controlled cooling region includes an upstream zone and a downstream zone in which the average cooling rates of fiber temperature differ, where the average cooling rates of fiber temperature in each of the upstream zone and downstream zone is less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s, and where the average cooling rate in the downstream zone is greater than the average cooling rate in the upstream zone by at least 5%, or at least 10%, or at least 15%, or at least 20%, or by an amount in the range from 5%-25%, or in the range from 10%-20%. In one embodiment, the upstream zone and downstream zone are adjacent with no intervening zones. In another embodiment, the upstream zone and downstream zone are separated by one or more intervening zones. In still another embodiment, the upstream zone is adjacent to the entrance of the fiber to the slow cooling device. In yet another embodiment, the downstream zone is adjacent to the exit of the fiber from the slow cooling device.

In further embodiments, the controlled cooling region of the slow cooling device includes three or more zones, or four or more zones, or five or more zones, or six or more zones, or between or 2 zones and 10 zones, or between 3 zones and 9 zones, or between 4 zones and 8 zones, where any pair or multiple pairs of zones differ in constant ambient temperature, average ambient temperature, constant cooling rate, and/or average cooling rate as disclosed herein. The pair of zones or any pair or pairs of zones within the multiple pairs of zones are adjacent in one embodiment and non-adjacent in another embodiment. In further embodiments, pairs of zones within multiple pairs of zones include an adjacent pair of zones and a non-adjacent pair of zones.

In one or more embodiments, methods of processing an optical fiber include cooling an optical fiber from a fiber temperature in the range from 1400° C.-1900° C., or a fiber temperature in the range from 1450° C.-1800° C., or a fiber temperature in the range from 1500° C.-1700° C. to a fiber temperature in the range from 1000° C.-1450° C., or a fiber temperature in the range from 1000° C.-1400° C., or a fiber temperature in the range from 1000° C.-1300° C., or a fiber temperature in the range from 1000° C.-1250° C., or a fiber temperature in the range from 1000° C.-1200° C., at a cooling rate less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s. Each of these embodiments are performable in one or more zones of a controlled cooling region of a slow cooling device and are performable in combination with other embodiments disclosed herein in different zones of a controlled cooling region of a slow cooling device, where the different zones are adjacent or separated by one or more intervening zones.

In one or more embodiments, methods of processing an optical fiber include cooling an optical fiber from a fiber temperature in the range from 1300° C.-1650° C., or a fiber temperature in the range from 1350° C.-1600° C., or a fiber temperature in the range from 1400° C.-1550° C. to a fiber temperature in the range from 1150° C.-1450° C., or a fiber temperature in the range from 1200° C.-1400° C., or a fiber temperature in the range from 1250° C.-1350° C. at a cooling rate less than 5000° C./s, or less than 4000° C./s, or less than 3500° C./s, or less than 3000° C./s, or less than 2500° C./s, or less than 2000° C./s, or less than 1500° C./s, or in the range from 1000° C./s-4500° C./s, or in the range from 1500° C./s-4000° C./s, or in the range from 2000° C./s-3500° C./s. Each of these embodiments are performable in one or more zones of a controlled cooling region of a slow cooling device and are performable in combination with other embodiments disclosed herein in different zones of a controlled cooling region of a slow cooling device, where the different zones are adjacent or separated by one or more intervening zones.

In some embodiments, the optical fiber is directed to a downstream processing unit upon exiting a slow cooling device. The fiber temperature at the entrance of a processing unit downstream from the exit of the slow cooling device is less than 1150° C., or less than 1125° C., or less than 1100° C., or less than 1075° C., or less than 1050° C., or less than 1025° C., or less than 1000° C., or in the range from 950° C.-1150° C., or in the range from 975° C.-1125° C., in the range from 1000° C.-1100° C.

To illustrate selected benefits associated with the present slow cooling device, representative examples are considered.

Example 1

Figure 2:
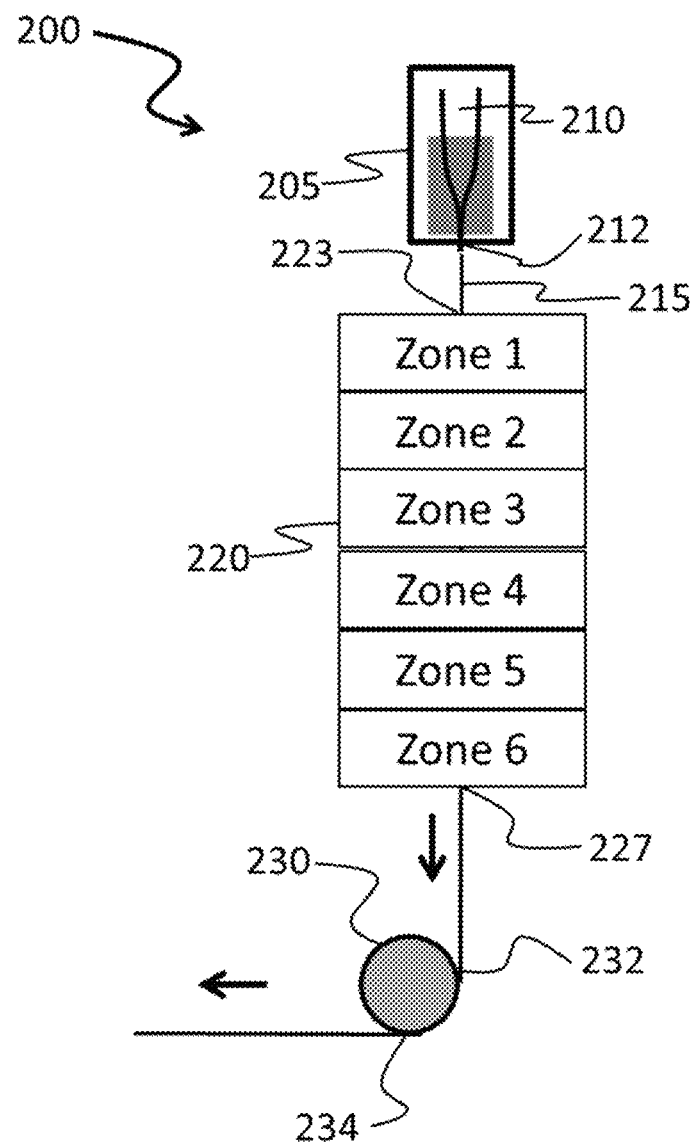
FIG. 2 depicts a fiber processing system and method having a draw furnace, a slow cooling device with multiple processing zones, and a fiber-turn device.

In this example, a slow cooling device having a controlled cooling region with six zones is considered. A schematic of the process is shown in FIG. 2. System 200 includes draw furnace 205 with fiber preform 210. Optical fiber 215 is drawn from fiber preform 210, exits draw furnace 205 at exit 212, and is directed to entrance 223 of slow cooling device 220. Optical fiber 215 passes through slow cooling device 220, emerges at exit 227, and is directed to fiber-turn device 230. Optical fiber 215 enters fiber-turn device 230 at entrance 232 and exits fiber-turn device 230 at exit 234 for delivery to optional downstream processing units (not shown). The arrows show the direction of conveyance of optical fiber 215.

Distance along the process pathway is measured from a furnace base plate located a short distance upstream from exit 212 of draw furnace 205. In the following discussion, the location of the furnace base plate is selected as the zero of position and position increases in the downstream direction along the process pathway away from the furnace base plate through exit 212 to slow cooling device 220. Entrance 223 of slow cooling device 220 is located downstream from exit 212. Slow cooling device 220 has a controlled cooling region that includes 6 zones numbered 1-6 in the downstream direction of the process pathway of optical fiber 215, as shown in FIG. 2. The length of each zone is 1 meter and the process pathway of the fiber extends through the center of each zone. The entrance to the controlled cooling region is located a short distance downstream from entrance 223 of slow cooling device 220. The exit from the controlled cooling region is located a short distance upstream from exit 227 of slow cooling device 220. Exit 227 is located 600 cm downstream of entrance 223. Entrance 232 of fiber-turn device 230 is located downstream of exit 227, at a position of 900 cm.

For purposes of illustration, the temperature of optical fiber 215 at entrance 223 to slow cooling device 220 was selected to be 2000° C. and the temperature of optical fiber 215 at entrance 232 of fiber-turn device 230 was selected to be about 1075° C. Optical fiber 215 had a Ge-doped silica core (average Ge doping concentration of 8 wt %) with a core diameter of approximately 6 microns and a silica cladding with an outer diameter of 125 microns.

Figure 3:
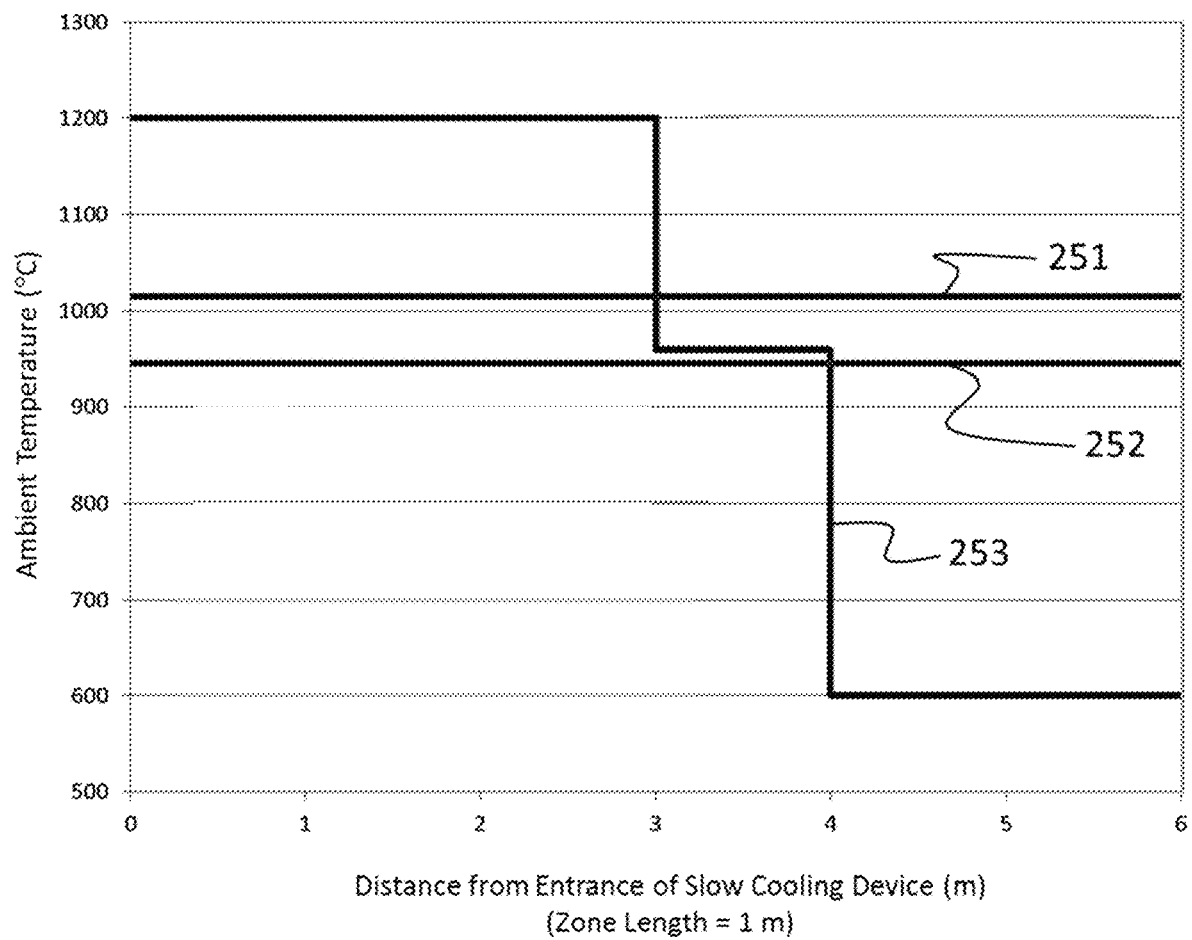
FIG. 3 depicts the ambient temperature profile for three configurations of the system and method of FIG. 2.

The process configurations are considered in this example. In a first configuration (Configuration 1), the fiber draw speed was set to 42 m/s and each zone of the controlled cooling region of slow cooling device 220 was set at a constant ambient temperature of 1015° C. In a second configuration (Configuration 2), the fiber draw speed was set to 45 m/s and each zone of the controlled cooling region of slow cooling device 220 was set at a constant ambient temperature of 945° C. Configurations 1 and 2 are representative of conventional slow cooling devices. The constant ambient temperatures were selected to minimize fiber fictive temperature at each draw speed. In a third configuration (Configuration 3), the fiber draw speed was set to 45 m/s and a gradient ambient temperature profile was used with slow cooling device 220. Each of the six zones of the controlled cooling region of slow cooling device 220 was set to a constant ambient temperature, but the ambient temperature of some zones differed from the ambient temperature of other zones. Zones 1-3 were set at a constant ambient temperature of 1200° C. Zone 4 was set at a constant ambient temperature of 960° C. Zones 5 and 6 were set at a constant ambient temperature of 600° C. The temperature profiles for each of the three configurations are shown in FIG. 3 and the conditions are summarized in Table 1. In FIG. 3, ambient temperature profiles for Configurations 1, 2, and 3 are shown by traces 251, 252, and 253, respectively. Distance is shown as distance from entrance 223 of slow cooling device 220. The length of each zone corresponds to a distance of 1 m.

TABLE 1

| Zone | Configuration 1 (42/m/s) T (° C.) | Configuration 2 (45 m/s) T (° C.) | Configuration 3 (45 m/s) T (° C.) |
|---|---|---|---|
| 1 | 1015 | 945 | 1200 |
| 2 | 1015 | 945 | 1200 |
| 3 | 1015 | 945 | 1200 |
| 4 | 1015 | 945 | 960 |
| 5 | 1015 | 945 | 600 |
| 6 | 1015 | 945 | 600 |

Figure 4:
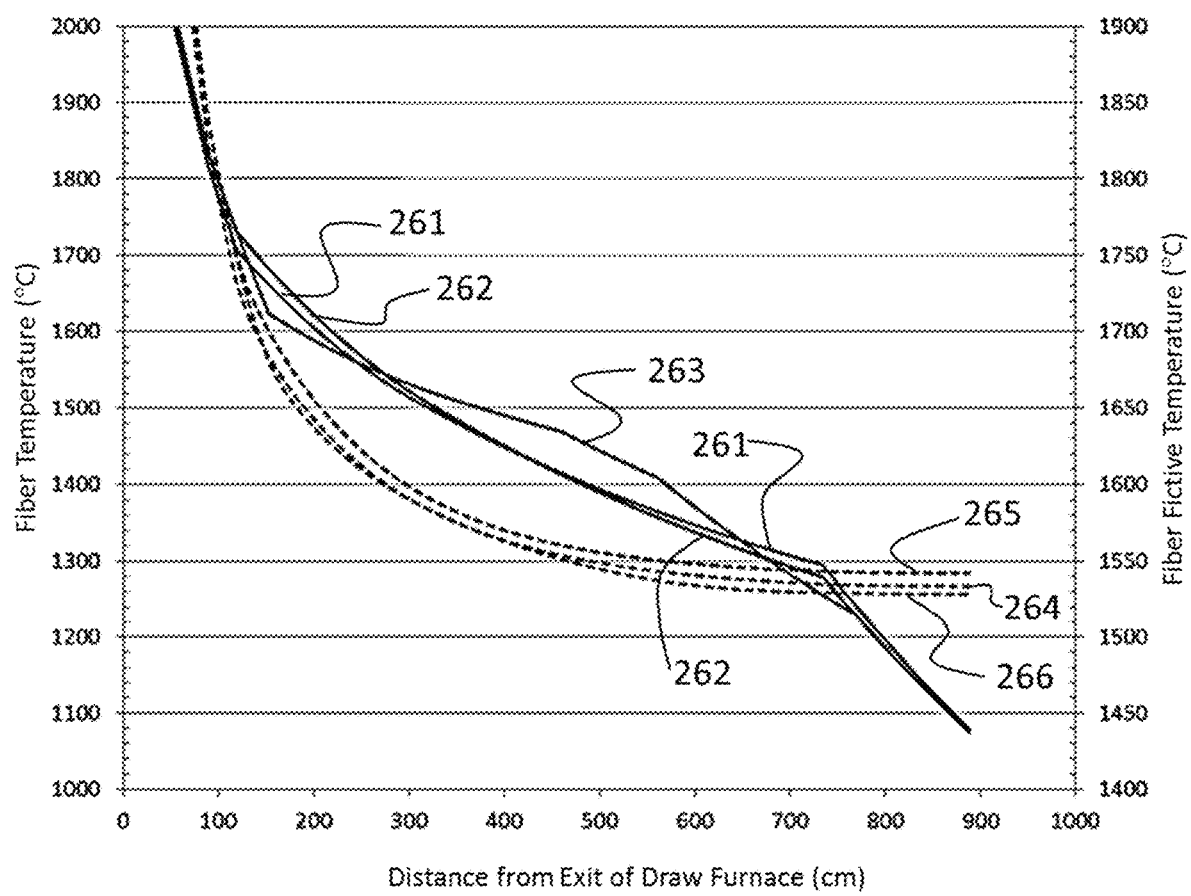
FIG. 4 depicts modeled fiber temperature and fiber fictive temperature for the three configurations having the ambient temperature profiles shown in FIG. 3.

Fiber temperature and fiber fictive temperature were modeled for each of Configurations 1-3. The results are shown in FIG. 4. Distance is measured from a furnace base plate located a short distance upstream from exit 212 of draw furnace 205. The fibers enter slow cooling device 220 at a distance of 119 cm (Configurations 1 and 2) or 153 cm (Configuration 3), exit slow cooling device 220 at a distance of 734 cm (Configurations 1 and 2) or 768 cm (Configuration 3), and enter fiber-turn device 230 at a distance of 900 cm. Solid traces depict fiber temperature and are associated with the temperature scale shown in the left abscissa. Dashed traces depict fiber fictive temperature and are associated with the temperature scale shown in the right abscissa. Traces 261, 262, and 263 show fiber temperature for Configurations 1, 2, and 3; respectively. Traces 264, 265, and 266 show fiber fictive temperature for Configurations 1, 2, and 3; respectively. The fiber temperature at entrance 223 of slow cooling device 220 was 1707° C., 1732° C., and 1624° C. for Configurations 1, 2, and 3; respectively. The fiber temperature at exit 227 of slow cooling device 220 was 1295° C., 1279° C., and 1230° C. for Configurations 1, 2, and 3; respectively. The fiber temperature at entrance 232 of fiber-turn device 230 was 1078° C., 1075° C., and 1075° C. for Configurations 1, 2, and 3; respectively. The fiber fictive temperature was essentially established at exit 227 of slow cooling device 220 and remained constant along the process pathway downstream of slow cooling device 220. The fiber fictive temperature at was 1534° C., 1542° C., and 1528° C. for Configurations 1, 2, and 3; respectively.

The change in fiber attenuation ΔAT at wavelength λ relative to a reference condition can be calculated from fiber fictive temperature using Eq. (1)

$$\Delta AT = \frac{A_\lambda}{\lambda^4}\left[1 - \frac{T_f}{T_{f,ref}}\right] \qquad (1)$$

where $A_\lambda$ is the Rayleigh spectral constant, $T_f$ is fiber fictive temperature, and $T_{f,ref}$ is the fiber fictive temperature at the reference condition. For purposes of comparing fibers produced from Configurations 1, 2, and 3, the fiber of Configuration 1 was selected as the reference fiber and a wavelength of 1310 nm was selected to compare attenuation. At 1310 nm, $A_\lambda = A_{1310\ nm} = 0.907$ dB/km-nm$^4$. Using the fictive temperatures for fibers produced by Configurations 1, 2, and 3, Eq. (1) yields changes in attenuation of 0.00034 dB/km and −0.00020 dB/km for Configurations 2 and 3, respectively, relative to Configuration 1. Fiber attenuation increases for Configuration 2 relative to Configuration 1 as the draw speed increases. The results for Configuration 3, however, show that the increase in fiber attenuation can be compensated at the higher draw speed of Configuration 2 by operating slow cooling device 220 with a graded ambient temperature profile.

To validate results from the model, a series of optical fibers was prepared in an experimental fiber draw process using the fiber design and processing conditions corresponding to Configurations 1, 2, and 3. For each configuration, a series of several fibers was drawn and attenuation at 1310 nm was measured. For Configuration 1, the attenuation ranged from 0.3205 dB/km-0.3224 dB/km with a median value of 0.3213 dB/km over the series of fibers. For Configuration 2, the attenuation ranged from 0.3200 dB/km-0.3211 dB/km with a median value of 0.3208 dB/km over the series of fibers. For Configuration 3, the attenuation ranged from 0.3197 dB/km-0.3215 dB/km with a median value of 0.3203 dB/km over the series of fibers. The experimental results are consistent with predictions of the model.

The results of this example show that the graded ambient temperature profile associated with Configuration 3 leads to higher fiber temperatures over a much longer portion of slow cooling device 220 than is observed for the constant ambient temperature profiles associated with Configurations 1 and 2 (compare trace 263 with traces 261 and 262). The fictive temperature of the fiber produced with the graded ambient temperature profile of Configuration 3 is accordingly reduced relative to the fictive temperatures of fibers produced with the constant ambient temperature profiles of Configurations 1 and 2 (compare trace 266 with traces 264 and 265). The fiber temperature at entrance 232 of fiber-turn device 230, however, is the same for Configurations 1, 2, and 3. The results show that a slow cooling device configured with a graded ambient temperature profile produces fibers having lower fictive temperature than corresponding slow cooling devices configured with a constant ambient temperature profile, while maintaining the flexibility needed to establish targeted temperatures downstream of the slow cooling device without compromising fiber attenuation when operating at higher draw speeds.

Example 2

In this example, the cooling rates in a slow cooling device are modeled. Cooling rate is defined as the rate of change of fiber temperature with respect to time and is expressed in units of ° C./s. The slow cooling device is of the type shown in FIG. 2 and included a controlled cooling region with six zones, each of which was 1 m in length along the process pathway. Cooling rates for Configuration 1 described in Example 1 and Configuration 5 were determined. For Configuration 5, the ambient temperature profile was graded. The ambient temperature in each zone was kept constant, but different constant ambient temperatures were used in some of the zones. Specifically, the ambient temperatures of zones 1-3 were set at 1165° C., the temperature of zone 4 was set at 875° C., and the temperatures of zones 5 and 6 were set at 725° C. The ambient temperature profiles of Configurations 1 and 5 are shown as dotted lines in FIG. 5 and are associated with the temperature scale shown at the right abscissa. Traces 271 and 273 depict the ambient temperature profile of Configurations 1 and 5, respectively. Distance in FIG. 5 corresponds to distance from the entrance of the controlled cooling region of the slow cooling device and extends from 0 cm (entrance of the controlled cooling region) to 600 cm (exit of the controlled cooling region). The entrance to the controlled cooling region of the slow cooling device corresponds to the entrance to zone 1 and the exit of the controlled cooling region of the slow cooling device corresponds to the exit from zone 6. The draw speed for both Configurations 1 and 5 was 42 m/s.

Figure 5:
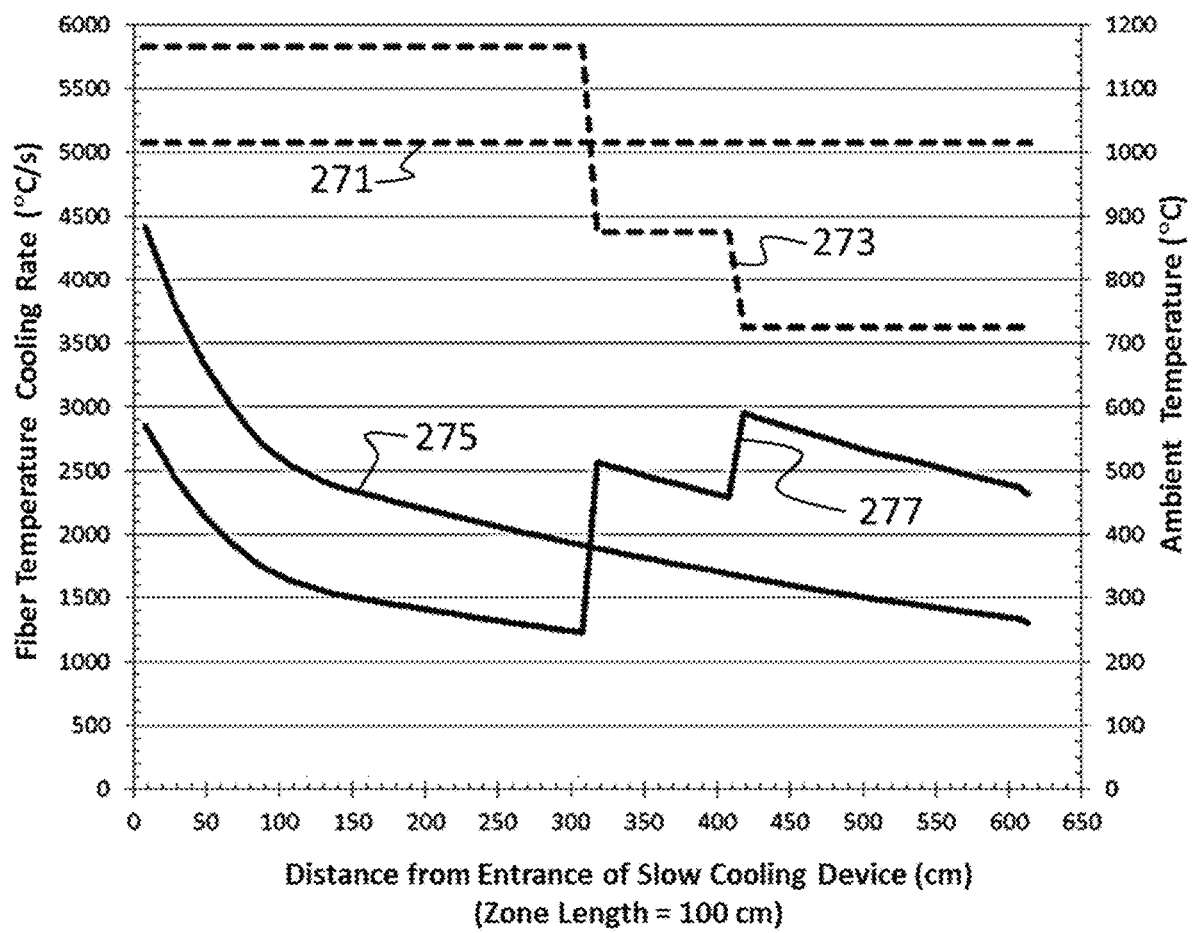
FIG. 5 depicts modeled fiber temperature cooling rates for a slow cooling device with a constant ambient temperature profile and a graded ambient temperature profile.

FIG. 5 also shows cooling rates of the fiber temperature as a function of position in the controlled cooling region of the slow cooling device. Traces 275 and 277 show cooling rates for Configurations 1 and 5, respectively, where cooling rates are shown on the scale at the left abscissa. For Configuration 1, the cooling rate shows a monotonic decrease from about 4400° C./s near the entrance of the slow cooling device to about 1300° C./s near the exit of the slow cooling device. The cooling rate for Configuration 5, in contrast, is non-monotonic and shows discontinuities or step changes at boundaries between zones maintained at different constant ambient temperatures. The cooling rate within each zone and across zones maintained at the same constant temperature is monotonically decreasing, but the overall cooling rate is non-monotonic due to differences in zone temperatures along the process pathway through the slow cooling device. Relative to Configuration 1, slower cooling rates are observed for Configuration 5 in the upstream portion of the slow cooling device (zones 1-3) due to the higher ambient temperature. As noted above, slow cooling rates are conducive to structural relaxation of the glass and a reduction in fiber fictive temperature. Because of the slower cooling rate, the fiber temperature at the exit of zone 3 is higher for Configuration 5 than for Configuration 1. By lowering the ambient temperature in the downstream portion of the slow cooling device (zones 4-6) relative to Configuration 1, the cooling rate for Configuration 5 is higher than the cooling rate observed for Configuration 1. The higher cooling rate for Configuration 5 in the downstream portion of the slow cooling device permits adjustment of the fiber temperature of Configuration 5 at the exit of the slow cooling device. For a given target fiber exit temperature, Configuration 5 provides an optical fiber having a lower fictive temperature than Configuration 1.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:
1. A method of processing an optical fiber comprising:
directing an optical fiber through an inlet of a slow cooling device to a first zone within the slow cooling device, the first zone having a first average ambient temperature;
cooling said optical fiber from a first fiber temperature to a second fiber temperature at a first cooling rate in said first zone, said first cooling rate being less than 5000° C./s;
directing said optical fiber from said first zone to a second zone within said slow cooling device, said second zone having a second average ambient temperature of at least 600° C., said first average ambient temperature being greater than said second average ambient temperature by at least 100° C.;
cooling said optical fiber from a third fiber temperature to a fourth fiber temperature at a second cooling rate in said second zone, said third fiber temperature being less than or equal to said second fiber temperature, said second cooling rate being greater than said first cooling rate and less than 5000° C./s.
2. The method of claim 1, wherein said first fiber temperature is in the range from 1600° C. 1800° C. and said second fiber temperature is in the range from 1400° C.-1550° C.

3. The method of claim 2, wherein said third fiber temperature is in the range from 1400° C. 1550° C. and said fourth fiber temperature is in the range from 1250° C.-1350° C.

4. The method of claim 3, wherein said first cooling rate is in the range from 1500° C./s-4000° C./s and said second cooling rate is greater than said first cooling rate by at least 250° C./s.

5. The method of claim 1, wherein said first fiber temperature is in the range from 1650° C.-1750° C. and said second fiber temperature is in the range from 1350° C.-1500° C.

6. The method of claim 5, wherein said third fiber temperature is in the range from 1350° C.-1500° C. and said fourth fiber temperature is in the range from 1200° C.-1300° C.

7. The method of claim 1, wherein said cooling at said first cooling rate comprises conveying said optical fiber at a draw speed of at least 50 m/s.

8. The method of claim 1, wherein a difference between said first fiber temperature and said first average ambient temperature is less than 500° C.

9. The method of claim 8, wherein a difference between said third fiber temperature and said second average ambient temperature is less than 500° C.

10. The method of claim 1, further comprising
directing said optical fiber from said second zone to a third zone within said slow cooling device;
cooling said optical fiber from a fifth fiber temperature to a sixth fiber temperature at a third cooling rate in said third zone, said fifth fiber temperature being less than or equal to said fourth fiber temperature, said third cooling rate being greater than said second cooling rate.

11. The method of claim 1, wherein said second average ambient temperature is at least 800° C.

12. The method of claim 1, wherein said second average ambient temperature is at least 1000° C.

13. The method of claim 1, wherein said second average ambient temperature is in the range from 700° C.-1000° C.

14. The method of claim 1, wherein said first zone has a length of 1 meter.

15. The method of claim 14, wherein said second zone has a length of 1 meter.

* * * * *